United States Patent [19]
Ljung

[11] Patent Number: 6,009,751
[45] Date of Patent: Jan. 4, 2000

[54] CORIOLIS GYRO SENSOR

[76] Inventor: Bo Hans Gunnar Ljung, 32 Hemlock Ter., Wayne, N.J. 07470-4342

[21] Appl. No.: 09/179,676

[22] Filed: Oct. 27, 1998

[51] Int. Cl.[7] ............................... G01P 9/04; G01P 15/02
[52] U.S. Cl. ...................................... 73/504.02; 73/504.12
[58] Field of Search ........................... 73/504.02, 504.03, 73/504.04, 504.08, 504.09, 504.12, 514.32; 74/5 R, 5.34, 5.37, 5.4, 5.47, 5 F

[56] References Cited

U.S. PATENT DOCUMENTS

| | | | |
|---|---|---|---|
| 3,941,001 | 3/1976 | LaSarge | 74/5.2 |
| 4,498,340 | 2/1985 | Duncan | 73/504.11 |
| 4,699,006 | 10/1987 | Boxenhorn | 73/504.12 |
| 5,203,208 | 4/1993 | Bernstein | 73/504.12 |
| 5,488,862 | 2/1996 | Neukermans et al. | 73/504.12 |
| 5,698,783 | 12/1997 | Murakoshi et al. | 73/504.08 |

Primary Examiner—Hezron Williams
Assistant Examiner—Helen C. Kwok

[57] ABSTRACT

A single or dual input-axis Coriolis gyro sensor is comprised of a single planar inertia-member (10) connected to a coplanar counter-inertia (13) by a first set of elastic beams (12). The counter-inertia is in turn supported by a second set of coplanar elastic beams (15). The counter-inertia counteracts the reaction forces from the vibrating inertia-member and isolates the inertia-member from external vibrations. The inertia-member is angularly dithered about its center of gravity along an axis perpendicular to the plane. An input rate about a first or second orthogonal axis, locate in the plane of the sensor results in Coriolis moments, causing angular oscillations of the inertia-member. The angular oscillations are restrained by squeeze film damping and voltages applied to electrostatic damping electrodes. The electrode voltages are representative of the angular input rates.

15 Claims, 4 Drawing Sheets

CORIOLIS GYRO SENSOR

BACKGROUND OF THE INVENTION

The present invention relates to an angular reference apparatus for measuring angular velocity using gyroscopic or Coriolis effect on a vibratory inertial body, and particularly to a new type of vibrating Coriolis gyro sensor.

As strapdown inertial navigation technology continues to progress, there is a need to develop Coriolis gyro sensors, or gyroscopes, which have high accuracy, low cost, small size, high bandwidth, and rapid reaction.

UK Patent application 2 113 842 by Langdon (1983) describes a dual input-axis Coriolis gyro sensor with one or two wheels, or inertia-members, that are angularly dithered about their rotational axis of symmetry. Although, according to Langdon, a single inertia-member is sufficient in principle, two counter-rotating inertia-members are required to make the sensor insensitive to externally applied vibrations. In addition to the external vibration sensitivity, an instrument with a single inertia-member also transmits considerable reaction forces to the instruments attachment points, where appreciable loss of energy takes place.

Coriolis gyro sensors with two counter-rotating inertia-members are however very difficult and expensive to fabricate because they require careful and time-consuming balancing procedures of both inertia-members. In principle, the two counter-rotating inertia-members must move with exactly the same amplitude and with exactly opposite phase in order for the reaction moments to cancel. In practice, additional mechanisms are required to insure proper amplitude and phase control.

As noted, a Coriolis gyro sensor with a single inertia-member looses appreciable energy, which must be re-supplied to the inertia-member. Energy is re-supplied to the inertia-member by means of a force or torque, which causes bias drift errors because of unavoidable phase and magnitude errors.

It is therefore a need for high accuracy Coriolis gyro sensors with a single inertia-member, in which energy losses are kept at a minimum. It is an object of this invention to reveal a new, highly accurate, single or dual input-axis vibratory Coriolis gyro sensor with a single inertia-member in which energy loss and sensitivity to external vibrations are minimized by elastically connecting the inertia-member to a flexibly supported counter-inertia, which counteract, or balances the reaction forces from the inertia-member.

Boxenhorn (U.S. Pat. No. 4,598,585) describes a single-axis gyro sensor, which is comprised of an outer frame, which is torsion spring supported about the y-axis. The outer frame in turn supports an inner plate (or inertia-member) with a pair of torsion springs, allowing the inner plate to flex around the x-axis. The inner plate carries on it a substantial mass, which acts as a gyroscopic proof-mass. Both the outer frame and the inertia-member are designed to resonate at the same frequency. The frame is dithered by electrostatic forces at its resonant frequency. An input rate of the sensor around the z-axis, causes the dither oscillation of the frame about the y-axis to excite the inner plate such that it vibrates about the x-axis, due to Coriolis forces. This vibration is detected by a set of capacitive sensors attached to the top of the inner plate.

Boxenhorn further teaches that the sensor may be made of one of several combinations of materials. The flexures may for instance be made of silicon dioxide, silicon nitride or silicon-oxy-nitrides which is deposited (or implanted) on one side of a silicon sheet. During the fabrication of the sensor, the deposited or implanted material, which is used both as an etch stop and as a material for the flexures, exhibit shrinkage or swelling relative the silicon sheet. Because of differences in thermal expansion and the built-in stress in the flexures, the resonant frequency of the frame and the inner element deviate from each other as the temperature is changed. This frequency deviation causes an undesirable change of gyro sensitivity over temperature.

Bernstein (U.S. Pat. No 5,203,208) describes a gyroscope with two weights attached to a spring-supported inertia-member. The inertia-member is made from a sheet of silicon, which is doped with boron in a thin layer near one surface. The boron doped part of the silicon sheet act as a convenient etch-stop during manufacturing and also serves as the material for the flexures. The resonant frequencies of the inertia-member are intended to be identical about the x- and y-axis. As temperature changes, the two frequencies deviate from each other due to a change in the built-in stress and different thermal expansion of the boron-doped silicon material used in the flexures as compared to the sheet material. Bernstein uses flexible slots to minimize the change of stress in the flexures over temperature. The flexible slots decrease the stiffness in the axial direction along the z-axis, which is highly undesirable. The fabrication processes disclosed in prior art devices require some form of etch stop material to delineate the flexures. Such materials have much less stability than pure silicon.

In the two inventions by Boxenhorn and Bernstein described above, the stress in the hinge material is difficult to control and the resulting resonant frequencies of the proof-mass are unpredictable, which cause the instruments to exhibit uncontrollable output errors.

The instant invention avoids this problem by the use of a unitary material for the manufacturing of the sensor. As shown in FIGS. 2 and 3, the flexible beams have the same thickness as the frame, the counter-inertia and the inertia-member. The inventor has found that a Coriolis gyro sensor with uniform thickness can be easily fabricated by etching from a single sheet of high purity silicon. The etching terminates when the base material is etched through, which obviates the need to use a dopant such as boron, or an embedded oxide layer, as an etch stop to define the flexures. The invention by Boxenhorn described above is extremely sensitive to linear vibrations in the plane of the sensor because the flexures are offset from the center of gravity along the z-axis. For example, linear vibrations at or near the dither frequency and directed along the x-axis, cause an oscillatory moment to develop that is indistinguishable from a Coriolis moment. Such vibrations hence cause large output signals from the gyro, even in the absence of external input rate. The instant invention avoids this problem by utilizing flexures that are coincident with the center of gravity.

BRIEF SUMMARY OF THE INVENTION

According to the present invention, there is provided a class of Coriolis gyro sensors with a single or dual input-axis. The Coriolis gyro sensor comprises an inertia-member, which is connected to a counter-inertia with flexible beams. The counter-inertia is in turn connected to a mounting frame with flexible beams. The mounting frame is rigidly attached to a fixed support, shaped to form a small gap which is utilized for capacitive sensing, driving and damping. The small gap is required both for electrical damping and for additional gas damping by the use of the squeeze film effect.

The flexible beams are configured to allow the inertia-member and the counter-inertia limited angular excursions about three orthogonal reference axes. The first and second reference axes are aligned along the principal symmetry axes of the inertia-member and also define the plane of the inertia-member, the counter-inertia, the flexible beams and the frame.

The inertia-member is angularly dithered at or near its natural frequency about the third orthogonal axis by electrostatic electrodes placed on the fixed support, adjacent to either the inertia-member or the counter-inertia. An electronic feedback signal from electrodes placed on the fixed support adjacent to the inertia-member ensures that the inertia-member dithers at constant amplitude with the help of automatic gain control.

In a dual input-axis implementation, the inertia of the inertia-member and the springrate of the flexible beams connecting it to the counter-inertia are proportioned to make the natural resonant frequencies about the first, second and third input-axis substantially identical.

An angular input rate introduced about the first axis results in a Coriolis moment or force, causing angular oscillation of the inertia-member about the second axis. A signal proportional to the velocity of the angular oscillation is measured with a capacitive pick-off and is then fed to an electrostatic damper electrode to create a torque that restrains or dampens the angular oscillations about the second axis. The moment or force amplitude is proportional to the angular input rate about the first axis.

Similarly, an angular input rate introduced about the second axis results in angular oscillations of the inertia-member about the first axis.

A single input-axis Coriolis gyro sensor is constructed by choosing a different natural frequency for the second axis as will be further described below. Damper electrodes for angular oscillation about the second axis are not required in this case, making the design less complex.

The inertia-member can have any regular symmetrical shape, such as a parallelepiped or round disk. The inertia-member, flexible beams connecting to the counter-inertia, the counter-inertia, the flexible beams connecting to the frame, and the frame are all located in the same plane which permits the Coriolis gyro sensor to be produced from a unitary sheet, using mass production technology.

As mentioned above, a Coriolis gyro instrument with a single inertia-member passes considerable reaction forces to the instruments attachment points, or shock absorbers, where appreciable loss of energy takes place. Shock absorbers are required in virtually all vehicular installations because gyro sensors in general are rather sensitive to shock and high frequency vibrations that emanate from a vehicle frame. Even if shock absorbers are not used, energy is still lost because of structural resonances in the vehicle frame.

The inventor has discovered that it is possible to eliminate mounting losses and external reaction forces from a Coriolis gyro instrument with a single inertia-member by the introduction of a counter-inertia and by: a) elastically connecting the inertia-member to the counter-inertia, b) elastically connecting the counter-inertia to the frame, and c) making the inertia of the counter-inertia larger than that of the inertia-member, d) making the natural resonant frequency of the counter-inertia smaller than that of the inertia-member, and e) fabricating the assembly from a unitary sheet of a low loss material.

The inventor has found that the energy loss for angular dither about the third axis is unexpectedly low. In most of the studied configurations, the energy loss is dominated solely by the energy loss in the low-loss material used for construction of the sensor. The low energy loss makes it possible to use a low voltage electrostatic torquer to dither the inertia-member. Electrostatic torquers that are operated in shear mode are notoriously weak, and in prior art devices often have to be operated at high voltage. A high voltage drive cause large unintended forces to develop perpendicular to the gap, which in turn causes large gyro output drift errors if combined with small misalignments of the torquer. The low energy loss in the disclosed structure makes it possible to minimize the unintended forces and the consequent drift error.

The instant invention allows the energy loss to be made as small as in a prior art Coriolis gyro sensor with two counter-rotating inertia-members, without the complication and added expense of having to balance both inertia-members.

The intimate coupling between the counter-inertia and inertia-member allows the latter to be indirectly dithered in an angular vibratory fashion about the third axis by electrostatically, or capacitively, driving the counter-inertia about the same axis. The advantage with indirect drive is that unintended electrostatic force components, perpendicular to the electrode surfaces, will not directly affect the inertia-member and cause output errors.

As mentioned above, the two counter-rotating inertia-members in a prior art Coriolis gyro sensor must move with exactly the same amplitude and exactly opposite phase in order for the reaction moments to cancel. Additional mechanisms such as levers and fulcrums are required to insure proper amplitude and phase control. Such added mechanisms are not required in a Coriolis gyro sensor according to the present invention, because the intimate coupling between the counter-inertia and the inertia-member ensures that amplitude and phase errors do not occur.

The present invention allows the manufacturing of simple, low energy loss, high performance Coriolis gyro sensors without the complication of using two counter-rotating inertia-members. The use of squeeze film damping allows the Coriolis gyro sensor to function in applications that subject the instruments to severe vibrational environments. The virtual absence of reaction forces from the Coriolis gyro sensor according to the present invention makes the sensor insensitive to external vibrations emanating from the vehicle frame.

Full details of the present invention are set forth in the following description of the preferred embodiments, as illustrated in the accompanying drawings, wherein:

An object of the instant invention is to disclose a simple, low energy loss, high performance gyroscope that is insensitive to external vibrations and that has improved frequency stability over time and temperature and which is easy to manufacture.

DETAILED DESCRIPTION OF PREFERRED EMBODIMENT

Figure 1:
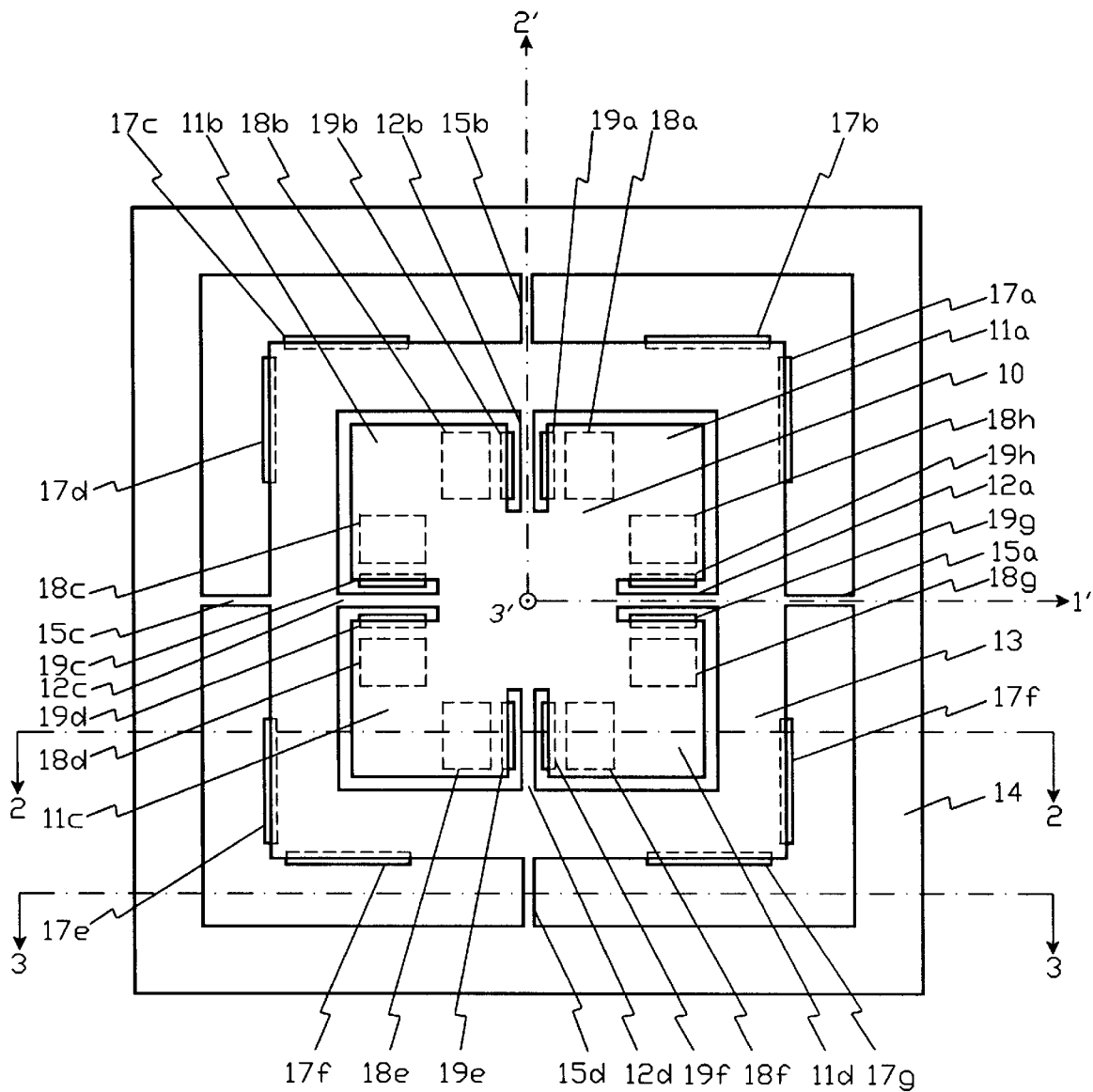
FIG. 1 is a plan view of a dual input-axis Coriolis gyro sensor.
Figure 2:
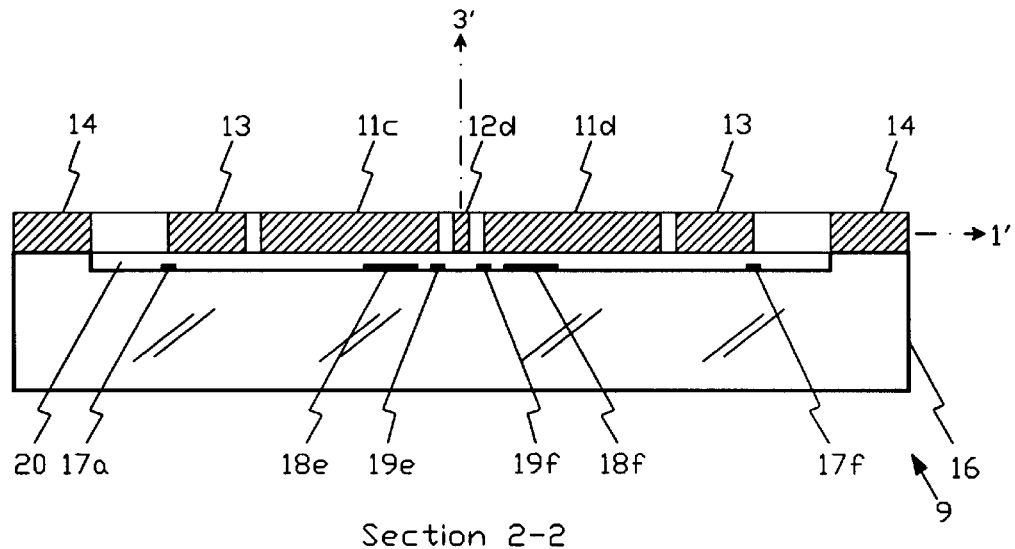
FIG. 2 is a sectional view of the embodiment in FIG. 1, including the fixed support, taken along section 2—2.
Figure 3:
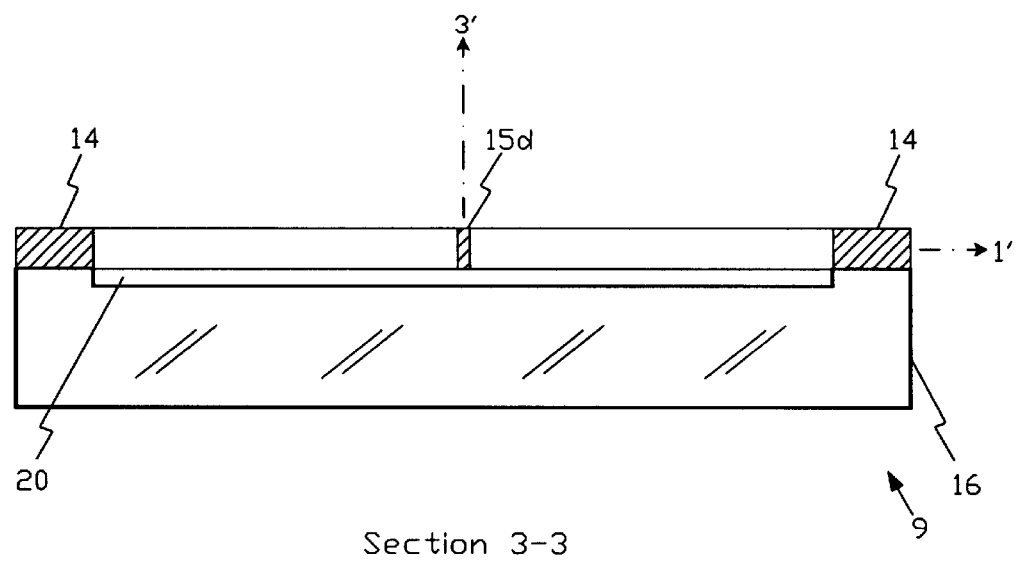
FIG. 3 is a sectional view of the embodiment in FIG. 1, including the fixed support, taken along section 3—3.

With reference to FIGS. 1, 2 and 3, a dual input-axis Coriolis gyro sensor is revealed that uses a single dithered inertia-member 10. The inertia-member 10 is fabricated to form four extensions 11a–11d. The inertia-member 10 is suspended by flexible supports or beams 12a–12d, to counter-inertia 13. The center of gravity of inertia-member 10 is made to coincide with the center of gravity of the counter-inertia 13.

The counter-inertia 13 is in turn elastically supported by flexible beams 15a–15d to mounting frame 14, which in turn is attached to a non-conductive fixed support 16. Electrodes 17a–17f, 18a–18h and 19a–19h are rigidly attached to fixed support 16. The fixed support 16 is shaped to form a small uniform gap 20, required for electrostatic sensing, driving and damping. Damping is provided for by a combination of squeeze film damping and electrical damping.

Figure 5:
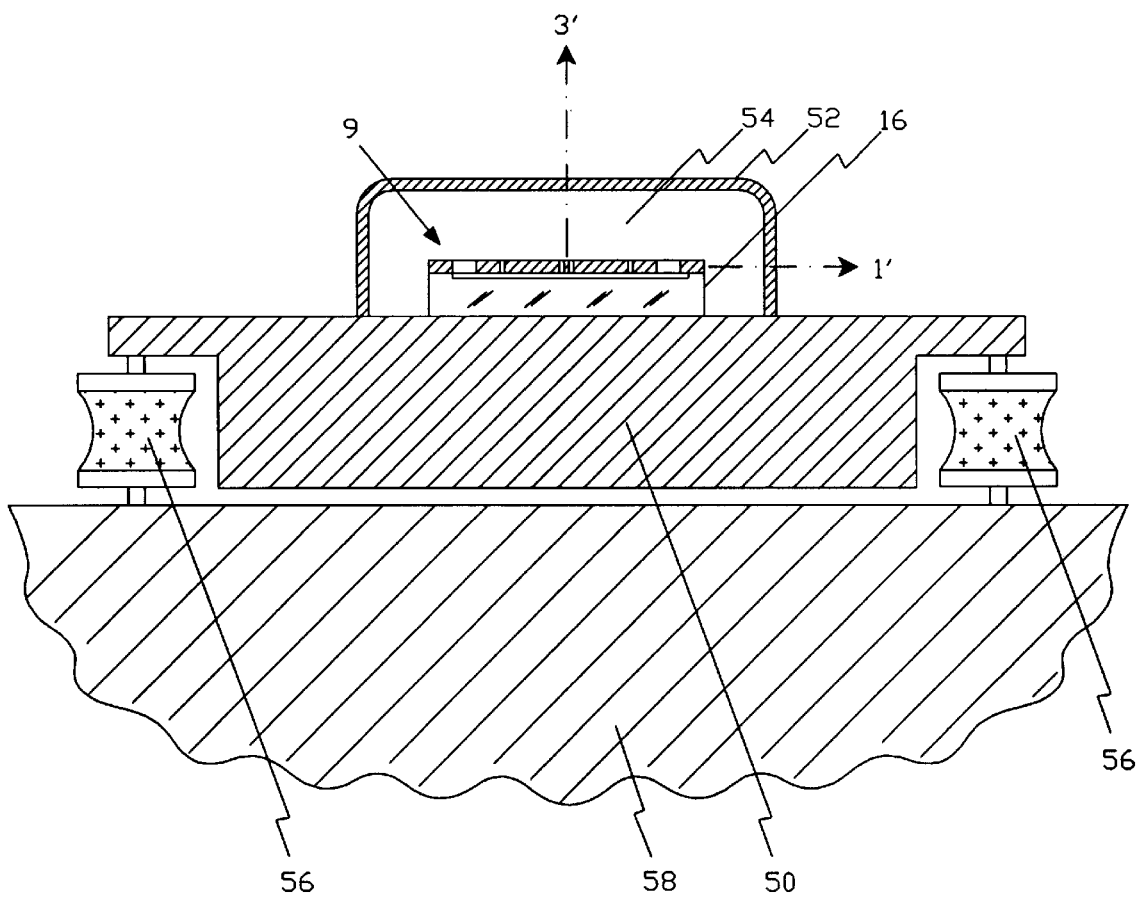
FIG. 5 is a reduced view of FIG. 2, which in addition schematically illustrates installation of the Coriolis gyro sensor in a vehicle.

With reference to FIG. 5, the Coriolis gyro sensor 9 is installed in a housing 52, with the fixed support 16 rigidly attached to an instrument base 50. The housing 52 hermetically seal the Coriolis gyro sensor 9 from the ambient atmosphere, and allow the sensor to be operated with a rarefied gas fill 54. Instrument base 50, is attached to a multiplicity of shock absorbers 56, which are in turn attached to a vehicle frame 58.

With reference to FIGS. 1, 2 and 3, the inventor has found that it is possible to angularly dither the inertia-member about axis 3' with very small energy loss by fabricating the inertia-member 10, counter-inertia-member 13, mounting frame 14, and flexible beams 12a–12d and 15a–15d, from a single unitary planar sheet of low loss material. Examples of such materials are single crystal silicon, single crystal quarts and fused silica.

Very small energy loss can further be attained by forming the counter-inertia 13 such that it has larger inertia than inertia-member 10, and by forming the elastic beams 15a–15d that connect the counter-inertia 13 to the mounting frame 14, such that the natural resonant frequency about axis 3' is smaller than that of inertia-member 10. This arrangement causes the counter-inertia 13 to contain, or balance most of the reaction force from the dithered inertia-member.

The inertia-member 10 is angularly dithered about axis 3' such that the bottom surface of the inertia-member 10 moves in a path parallel to the fixed support 16. Shear damping in the gap 20 can be made very small if a suitable choice is made of gas and operating pressure. A suitable gas would be selected from low molecular-weight noble gasses at an operating pressure corresponding to a fraction of ambient atmospheric pressure.

Out of plane motion of the elastically supported structures causes considerable damping because of the squeeze film effect. Such damping is substantially larger than the previously described shear damping. Squeeze film damping allows the Coriolis gyro sensor to operate in a vibrationally demanding environment with minimal output errors.

External rotational input rates about axis 1' or 2' causes a Coriolis moment on the inertia-member 10, which causes it to angularly vibrate with motion perpendicular to the gap 20. These vibrations are damped by a combination of electrical damping forces and squeeze film damping forces. This is desirable because it allows the Coriolis gyro sensor to respond quickly to external rotational inputs.

Angular dither of inertia-member 10 about axis 3' is measured capacitively by electrodes 19c, 19d, 19g and 19h, attached to fixed support 16.

Inertia-member 10 can be directly dithered about axis 3' by electrodes 19a, 19b, 19e and 19f on the fixed support 16. These arrangements of electrodes cause a net shear force, necessary to dither inertia-member 10, but also an appreciable force component perpendicular to the electrode surface. The perpendicular force affecting the inertia-member 10 is balanced and does not cause a bias drift rate by itself. Unfortunately, a slight misalignment of the electrodes causes a relatively large unbalanced force, resulting in a large bias drift rate that compromises the operation of the Coriolis gyro sensor.

The inertia-member 10 and counter-inertia 13 are intimately mechanically coupled about axis 3'. Inertia-member 10 can be indirectly dithered in an angular vibratory fashion by electrostatically driving the counter-inertia 13 about axis 3' by excitation of electrodes 17a–17g on fixed support 16. The advantage with indirect drive is that the electrostatic force components perpendicular to the electrode surfaces, along axis 3', will not directly affect the inertia-member.

With reference to FIG. 3, the indirect dither drive can be further improved by forming the elastic beams 15a'–15d' to make the springrate high for linear displacements along axis 3'. This can be accomplished by making the rectangular cross-section of the elastic beams 15a'–15d' tall and slender, with the largest dimension aligned in the direction of axis 3'.

Figure 4:
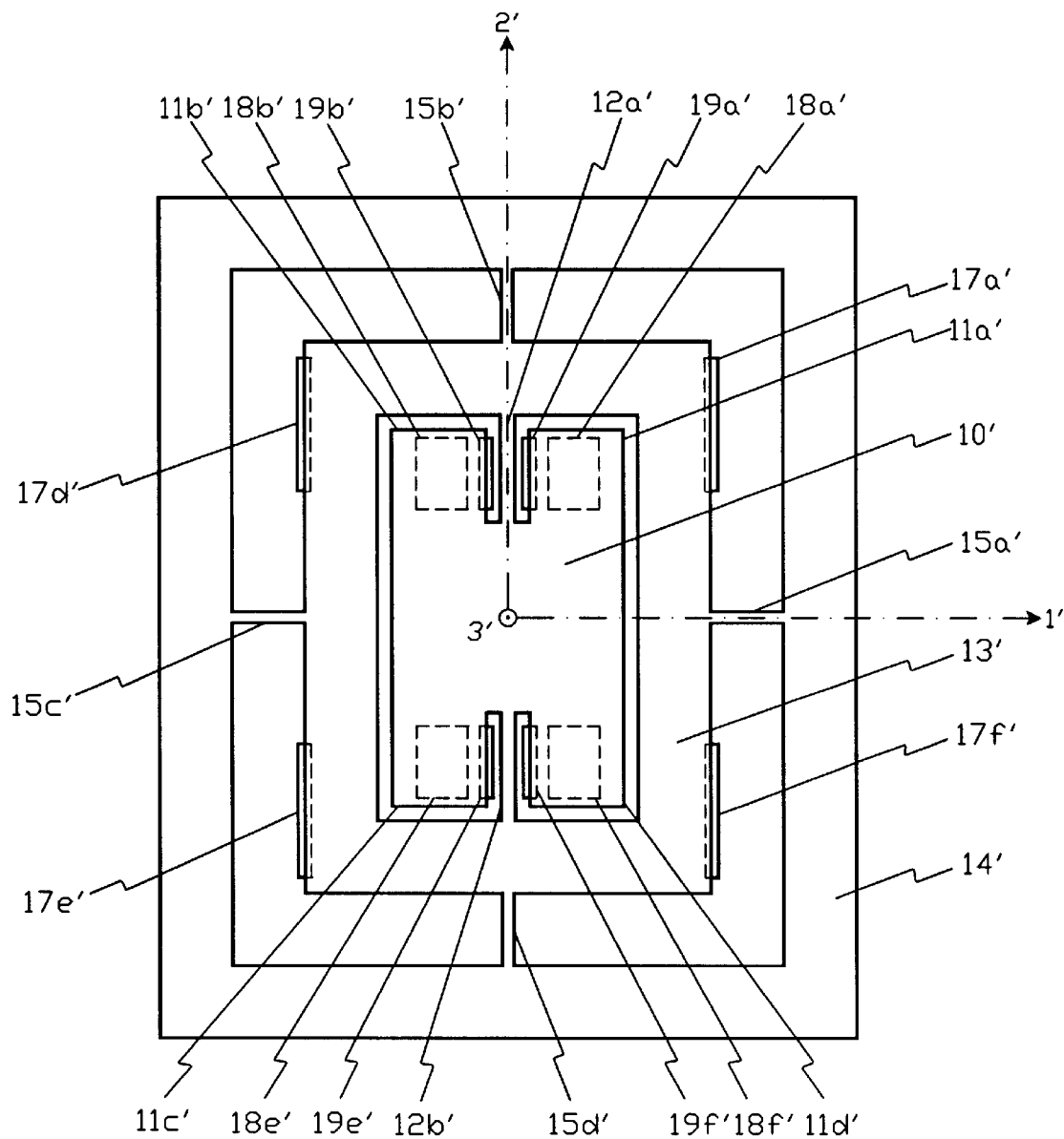
FIG. 4 is a plan view of a single input-axis Coriolis gyro sensor.

Another preferred embodiment, a single input-axis Coriolis gyro sensor, is illustrated in FIG. 4. Because of the similarity in design, like elements have been given the same but primed number as in FIGS. 1, 2 and 3. With reference to FIG. 4, inertia-member 10' has a generally rectangular outline, characterized by four extension 11a'–11d'. Inertia-member 10' has its largest extension in the direction of axis 2', and it is elastically connected to counter-inertia 13' via two collinear flexible beams 12a' and 12b'. Inertia-member 10' is supported by flexible beams 12a' and 12b', proportioned such that the resonant frequency of inertia-member 10' is substantially equal about axis 1' and 3'. Flexible beams 12a' and 12b' are further proportioned such that the resonant frequency of inertia-member 10' about axis 2' is substantially different than about axis 1' and axis 3'. Such proportioning obviates the need for several sensor electrodes and damper electrodes about axis 2' and simplifies the balancing procedure of the sensor, which keeps the cost of a single input-axis Coriolis gyro sensor low.

Still with reference to FIG. 4, electrodes 17a', 17d', 17e' and 17f may be used to dither the inertia-member 10' about axis 3'. Electrodes 19a', 19b', 19e' and 19f are used to sense the dither motion of inertia-member 10' about axis 3'.

Electrodes 18a', 18b', 18e' and 18f are used to sense and damp the Coriolis moment due to a input rate about axis 2'. The output signal from this set of electrodes represent the input rate about axis 2'.

Although the description above contains many specificities, these should not be construed as limiting the scope of the invention but as merely providing illustrations of some of the presently preferred embodiments of this invention. For example, the cross-section of the elastic beams can have other shapes, such as circular, oval, trapezoidal, prismatic, triangular, etc.

Thus the scope of the invention should be determined by the appended claims and their legal equivalents, rather than by the examples given.

What I claim as my invention is:

1. A Coriolis gyro sensor comprising:
 (a) an inertia-member, and a counter-inertia;
 (b) a first suspension means connecting said inertia-member to said counter-inertia; and (c) a second suspension means connecting said counter-inertia to a fixed mounting frame; wherein (d) said first, and said second suspension means allow separate and limited angular motion of said inertia-member, and said counter-inertia; further including (e) a driving means to drive said inertia-member in an angular dither motion;

(f) a sensing means generating signals representative of angular oscillatory motions of said inertia-member relative said fixed mounting frame; and (g) a restraining means generating damping forces acting on said inertia-member; wherein (h) said forces from said restraining means are representative of input rate rotation of said Coriolis gyro sensor to form a single or dual input-axis Coriolis gyro sensor; and wherein (i) said counter-inertia counteracts reaction forces from said inertia-member.

2. A Coriolis gyro sensor according to claim 1, wherein:

(a) said inertia-member, said first suspension means, said counter-inertia, said second suspension means, and said mounting frame extend substantially in a plane; and (b) said inertia-member, and said counter-inertia are formed to locate the center of gravity of said inertia-member, and said counter-inertia substantially coincident.

3. A Coriolis gyro sensor according to claim 2, further including:

(a) a fixed support to which said mounting frame is rigidly attached;

(b) a first, second, and third reference axes located to form an orthogonal set intersecting said center of gravity of said inertia-member, and said counter-inertia; wherein (c) said first, and said second reference axes are located in said plane;

(d) said inertia-member is formed to align the principal axes of symmetry of said inertia-member along said first, second and third reference axes;

(e) said counter-inertia is formed to align the principal axes of symmetry of said counter-inertia along said first, second and third reference axes; and (f) said angular dither motion of said inertia-member is directed about said third reference axis.

4. A Coriolis gyro sensor according to claim 3, wherein:

(a) said first suspension means is formed to impart said inertia-member with a first rotational resonant frequency about said third reference axis; and (b) said second suspension means is formed to impart said counter-inertia with a second rotational resonant frequency about said third reference axis; wherein (c) the polar inertia of said counter-inertia about said third reference axis is substantially larger than the polar inertia of said inertia-member about said third reference axis.

5. A Coriolis gyro sensor according to claim 4, wherein: said inertia-member, said counter-inertia, said first suspension means, said second suspension means, and said mounting frame are formed from a unitary material selected from a group of low loss materials that include single crystal silicon, single crystal quartz, and fused silica.

6. A Coriolis gyro sensor according to claim 5, wherein:

(a) said fixed support is shaped to form a substantially uniform gap between said inertia-member and said fixed support, and between said counter-inertia and said fixed support;

(b) said restraining means comprise electrostatic electrodes attached to said fixed support, proximate said inertia-member, and a gas of predetermined pressure and composition; and wherein (c) said pressure and said composition of said gas is selected to cause substantial damping forces of said inertia-member and said counter-inertia for motions perpendicular to said plane, and negligible damping forces for motions parallel to said plane.

7. A Coriolis gyro sensor according to claim 6, wherein:

(a) said sensing means comprise electrostatic electrodes attached to said fixed support, proximate said inertia-member; and (b) said sensing means comprise a signal representative of said angular dither motion of said inertia-member about said third reference axis.

8. A Coriolis gyro sensor according to claim 7, wherein:

said driving means to drive said inertia-member in an angular dither motion about said third reference axis comprise electrostatic electrodes rigidly attached to said fixed support, proximate said inertia-member.

9. A Coriolis gyro sensor according to claim 3, wherein:

(a) said first suspension means comprise a first set of multiple elastic beams;

(b) said second suspension means comprise a second set of multiple elastic beams;

(c) said first set of multiple elastic beams are formed to locate the longitudinal axes of said first set of multiple elastic beams to intersect said center of gravity of said inertia-member; and (d) said second set of multiple elastic beams are formed to locate the longitudinal axes of said second set of multiple elastic beams to intersect said center of gravity of said counter-inertia.

10. A Coriolis gyro sensor according to claim 9, wherein:

(a) said inertia-member is formed to have substantially equal moments of inertia about said first axis and about said second axis; and (b) said first set of multiple elastic beams are formed to provide substantially equal rotational resonant frequencies of said inertia-member about said first, second and third axis; wherein (c) a dual input-axis Coriolis gyro sensor is formed.

11. A Coriolis gyro sensor according to claim 10, wherein:

(a) said first set of multiple elastic beams comprise four elastic beams arranged in a cruciform orientation; and (b) said second set of multiple elastic beams comprise four elastic beams arranged in a cruciform orientation.

12. A Coriolis gyro sensor according to claim 9, wherein:

(a) said inertia-member and said first set of multiple elastic beams are formed to provide substantially equal rotational resonant frequencies about said first axis and about said third axis; and (b) said inertia-member and said first set of multiple elastic beams are formed to provide a rotational resonant frequency about said second axis that is substantially different than the rotational resonant frequency of said inertia-member about said first axis; wherein (c) a single input-axis Coriolis gyro sensor is formed.

13. A Coriolis gyro sensor according to claim 12, wherein:

(a) said first set of multiple elastic beams comprise two collinear elastic beams; and (b) said second set of multiple elastic beams comprise four elastic beams arranged in a cruciform orientation.

14. A Coriolis gyro sensor according to claim 9, wherein:

said second set of multiple elastic beams is formed to impart high stiffness for linear displacement of said counter-inertia along said third axis, and low stiffness for angular displacement of said counter-inertia about said third axis.

15. A single or dual input-axis Coriolis gyro sensor comprising:
   (a) an inertia-member attached to a counter-inertia by a first flexible connecting means;
   (b) a second flexible connecting means attaching said counter-inertia to a fixed frame;
   (c) a driving means to impart a predetermined angular oscillation to said inertia-member; where
   (d) said predetermined angular oscillation of said inertia-member generates a polar angular oscillating torque;
   (e) said first flexible connecting means transfer said polar angular oscillating torque to said counter-inertia; and where
   (f) said polar angular oscillating torque is balanced by said counter-inertia;
   (g) a damping means generating restraining forces acting on said inertia-member; wherein
   (h) said forces from said damping means are representative of input rate rotation.

* * * * *